United States Patent [19]
Schlangen

[11] 3,932,729
[45] Jan. 13, 1976

[54] MULTI-STAGE ELECTRIC HEATER APPARATUS AND METHOD OF CONTROL

[75] Inventor: Andrew J. Schlangen, La Crosse, Wis.

[73] Assignee: The Trane Company, La Crosse, Wis.

[22] Filed: Oct. 23, 1974

[21] Appl. No.: 517,075

[52] U.S. Cl.............................. 219/486; 219/483
[51] Int. Cl.²........................................... H05B 1/02
[58] Field of Search .......... 219/480, 483, 484, 486, 219/487

[56] References Cited
UNITED STATES PATENTS

| | | | |
|---|---|---|---|
| 2,848,588 | 8/1958 | Hackman | 219/486 |
| 3,052,788 | 9/1962 | Peters | 219/480 |
| 3,161,758 | 12/1964 | Biermann et al. | 219/480 |
| 3,579,264 | 5/1971 | Mork et al. | 219/486 |

*Primary Examiner*—R. N. Envall, Jr.
*Assistant Examiner*—Fred E. Bell

[57] ABSTRACT

An electric heater control circuit is shown which utilizes a 10-step controller for obtaining eighteen steps of heating control. Electrical and magnetic control circuitry operates this 10-step controller effectively through two cycles, one at a low level power output mode and a second at a high level power output mode, to thereby substantially increase the effective number of steps of heat control. In addition, means are provided for instantaneously energizing or de-energizing a plurality of small electric heaters upon shifting modes to compensate for the de-energization or energization respectively of a large heater to thereby avoid momentary periods of excess heat or cold while the controller is shifting modes.

12 Claims, 1 Drawing Figure

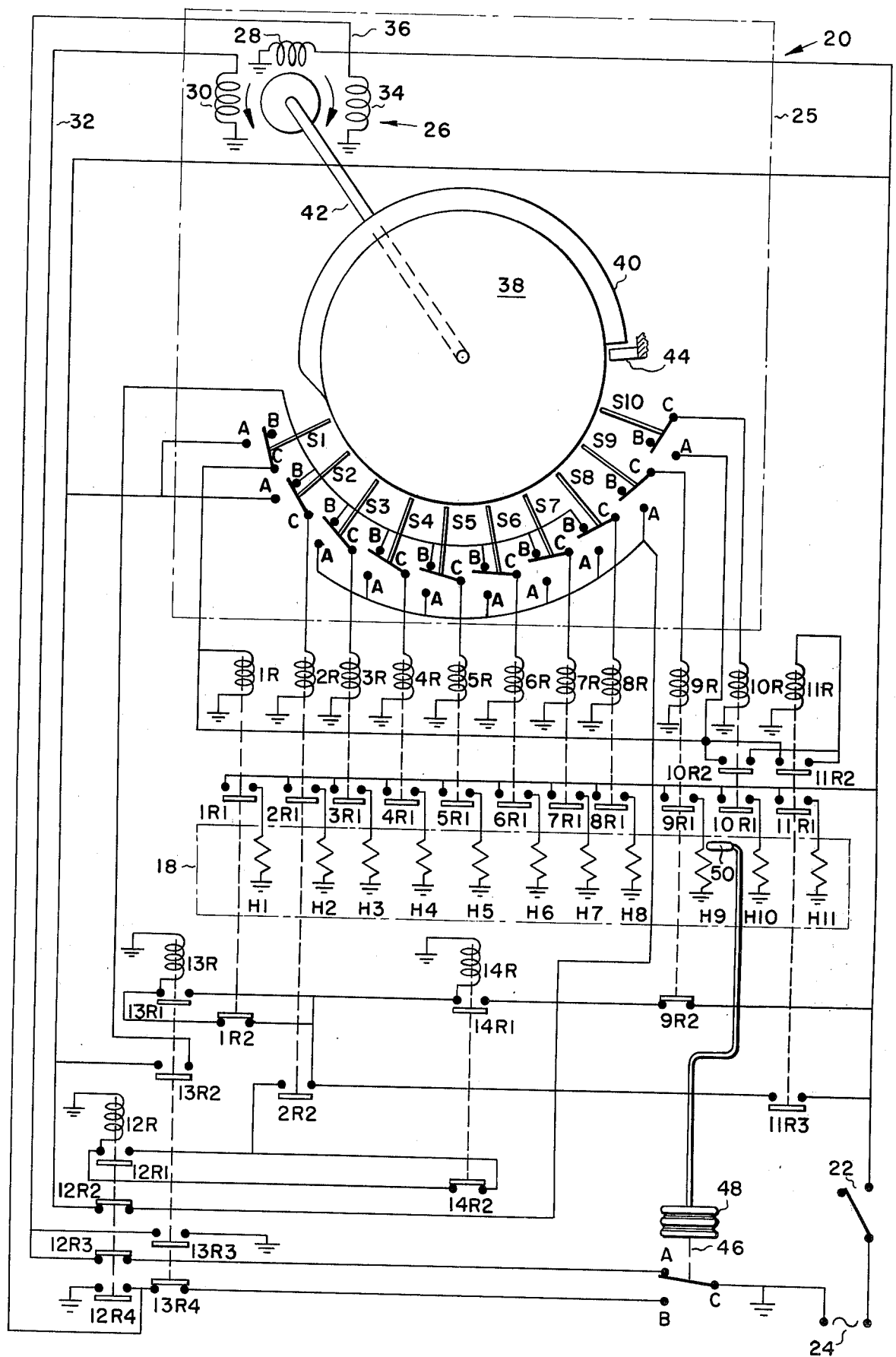

MULTI-STAGE ELECTRIC HEATER APPARATUS AND METHOD OF CONTROL

In the simpliest terms this invention provides means for effectively increasing the number of steps of a multi-step controller. In the particular example given, a 10-step controller is connected to provide an 18-step output. Similarly a 20-stage controller may be made to provide a 38-stage output. The output of the stages is used to control electric heaters for a conditioned space. It is therefore an object of this invention to provide a thermostatically controlled electric heating system with substantially more stages of heat control than may be directly provided from a multi-stage controller.

Other objects and advantages of this invention will become more apparent as this specification proceeds to describe the invention with reference to the sole drawing which schematically illustrates the invention.

Referring to the drawing, it will be seen that heaters H1–H11 are disposed in heat exchange relationship with a conditioned space 18. A control system 20 is provided for controlling the heating output of heaters H1–H11 in response to the temperature of the space 18.

For purposes of more fully understanding the operation of the control system 20, the system is shown in the completely de-energized condition. All relays are assumed to raise their respective armature contacts or switches upon energization. All normally closed contacts are shown as closed and all normally open contacts are shown as open.

The basic elements of the control system include a step controller 25, a plurality of heater relays 1R–11R, a plurality of heaters H1–H11, relay 12R, relay 13R, time delay relay 14R, thermostat 46, and switch 22.

More specifically it will be noted that relay 12R has two normally open contacts, 12R1 and 12R4, and two normally closed contacts 12R2 and 12R3. Relay 13R has three normally open contacts 13R1, 13R2, and 13R3 and one normally closed contact 13R4. Time delay relay 14R has one normally open contact 14R1 and one normally closed contact 14R2. Each of relays 1R–11R have respectively normally open heater contacts 1R1–11R1 in series respectively with heaters H1–H11. In addition, relay 1R has normally closed contacts 1R2 and relay 2R has normally open contacts 2R2. Relay 9R, in addition, has normally closed contacts 9R2. Relay 10R, in addition, has normally open contacts 10R2. Relay 11R, in addition, has two normally open contacts 11R2 and 11R3. Relay 14R is provided with approximately 1 second time delay in opening of contacts 14R2. All other relays may be assumed to act substantially instantaneously for purposes of this disclosure.

Each of switches S1–S10 is a single pole double throw switch providing connection between terminals B and C in the position shown and between terminals A and C upon being actuated by the raised portion 40 of cam 38. Cam 38 is rotatably positioned by a cam motor 26 having a driving connection 42 therewith. Terminal B of switches S1, S9 and S10 are not used. The cam motor 26 has a field winding 28, a forward winding 30 for forward operation of motor 26 and a reverse winding 34 for reverse operation of motor 26. In the embodiment shown, windings 30 and 34 are the shading rings on a shaded pole motor. It will be appreciated, however, that the windings 30 and 34 could be of other types to obtain bi-directional operation of the motor 26.

For understanding the control circuit a brief explanation of the general purpose of the various control relays is here provided. However, such explanation must be preceded by a general explanation of the control modes provided by the control system.

As aforementioned, the control system provides both a low level output mode and a high level output mode. In the embodiment shown, each of heaters H1–H10 is selected to provide 5½% of the full heating power of the control system. Heater H11 is selected to provide 45% of the full heating power of the system.

It should be understood that each heater may be provided with more than one resistance element. In some systems having very large heaters it may also be necessary to provide more than one heater control relay for a heater. Thus if heater H11 is very large, it may include several heating elements each operated by a separate relay. However, such relays would be made to operate together so the heaters would be controlled as one large heater by the controller.

The system is operating on the low level output mode when the large heater H11 is de-energized. The system is operating on the high level output mode when the large heater H11 is energized. During both the high and the low level output modes, small incremental changes in heating output are made by the thermostat through operation of the cam actuating a fewer or greater number of switches controlling the small heaters. During the transition from the low level output mode to the high level output mode, relay 12R causes the cam 38 to be driven in reverse (clockwise) direction and de-energizes a number of the smaller heaters substantially simultaneously with the energization of the larger heater. In this manner a large change in heat output which might be sensed by occupants of the space 18 is obviated. In like manner, during the transition from the high level output mode to the low level output mode, relay 13R causes the cam 38 to be driven in a forward (counterclockwise) direction and energize a number of the smaller heaters substantially simultaneously with the de-energization of the large heater. Each of relays 12R and 13R are thus arranged to override thermostat 46 and cause the cam motor 26 to operate in a direction opposite to that dictated by the thermostat.

Relay 14R facilitates in the control of relays 12R and 13R. Thus during the low level output mode operation relay 14R prevents relay 12R from being energized through contacts 9R2, 14R1 and 2R2 and prevents relay 13R from being energized through contacts 9R2, 14R1 and 1R2. During the high level output mode operating relay 14R via contacts 14R2 prevents relay 12R from being energized by contacts 2R2 upon energization of relay 2R. Relay 14R permits relay 12R to be energized via contacts 14R2 at the transition from low to high level mode operation. Relay 14R via contacts 14R1 permits relay 13R to be energized when switch S1 is opened for the transition from high level to low level output mode operations.

The operation of the control system will now be explained in detail. This will serve also to further define the control system circuitry. It will be assumed that at the start there is a demand for heating space 18 and that consequently the switch of thermostat 46 is in the position shown bridging between terminals A–C as positioned by thermostat bellows 48 in response to sensing bulb 50 disposed in heat exchange relation with the space 18. Electrical power is provided from a source 24, one side of which is shown as grounded. The grounds on the various circuit elements complete the various circuits to the power source.

Upon closure of manual switch 22, a first circuit is established, energizing the field winding 28 of motor 26. A first motor circuit 32 is complete and includes the motor forward winding 30, contacts 12R3 and terminals A–C of thermostat 46. Motor 26 is thus energized to drive in the forward direction whereby cam 38 is driven via drive connection 42 in the counterclockwise direction. This brings the raised portion 40 of cam 38 progressively and sequentially in contact with the switches S1–S10 causing the switches to switch from the position shown connecting terminals B–C to the position connecting termainals A–C. Thus, a circuit is made including termainals A–C of switch S1 and relay 1R causing the relay 1R to be energized. Energization of relay 1R causes the contacts 1R1 thereof to be closed whereby a circuit is completed which includes contact 1R1 and heater H1. Thus the actuation of switch S1 by cam 38 operates to energize heater H1.

The cam 38 is made to operate slowly. Typically, cam 38 may be turned at a speed of one-half turn in 7 minutes. This may be accomplished by the use of gears in the drive connection 42.

If the energization of heater H1 is sufficient to meet the heating demand of space 18, thermostat 46 through sensing bulb 50 and bellows 48 will cause the thermostat to move to an intermediate position breaking the circuit between terminals A–C. This will open the circuit energizing the cam motor 26 thereby causing the cam 38 to stop in this position.

Should the heat supplied by heater H1 exceed the demand as sensed by thermostat 46 with bellows 48 and sensor bulb 50, the thermostat 46 will move to the position bridging between terminal B–C. This will cause energization of the second motor circuit 36 including terminals B–C of thermostat 46, contact 13R4, and cam motor reverse winding 34 thereby causing the cam motor to drive in the reverse direction, driving the raised portion 40 of cam 38 away from switch S1. This opens the circuit energizing relay 1R which in turn opens the circuit including contacts 1R1 and heater H1 thereby deenergizing heater H1.

Should the heat supplied by heater H1 be insufficient to meet the demand as sensed by thermostat 46 the cam motor 26 will continue to drive the cam in the counterclockwise direction actuating additional switches. Actuation of switch S2 to the A–C bridging position energizes relay 2R which closes contacts 2R1 and 2R2. Closing of contacts 2R1 energizes heater H2. Similar actuation of switches S3–S9 will thus enable relays 3R–9R to be energized to energize heaters H3–H9.

It will thus be seen that the cam will move to a position in which the proper number of switches S1–S9 are actuated to energize in similar manner the heaters H1–H9 to meet the heating demand of Space 18. The number of such heaters H1–H9 that are energized will vary according to variations in the heating load of space 18.

Should the heating load demand in space 18 exceed the heat supplied by the sum of heaters H1–H9, cam 38 will accordingly be rotated in the counterclockwise direction until the raised portion 40 actuates switch S10. The actuation of switch S10 to the position bridging terminals A–C automatically switches the control system to the operation herein defined as the high level output mode. This is accomplished in the following manner.

Upon actuation of switch S10 a circuit is established including terminals A–C of switch S1, terminals A–C of switch S10, and relay 10R. Energization of relay 10R closes contacts 10R2, and 10R1. Closure of contacts 10R2 energizes relay 11R through a circuit including terminals A–C of switch S1, contacts 10R2 and relay 11R. Energization of relay 11R closes contacts 11R1, 11R2, and 11R3. Closure of contacts 10R1 and 11R1 energizes heater H10 and H11. Closure of contacts 11R2 closes a holding circuit whereby relay 11R may remain energized despite opening of contacts 10R2 through a circuit including terminals A–C of switch S1, contacts 11R2 and relay 11R.

As a prerequisite to the acutation of switch S10, switch S2 has been actuated as aforementioned to energize relay 2R thereby closing contacts 2R2. The closure of contacts 11R3 which are thus operatively associated with switch S10 through relay 10R, contacts 10R2 and relay 11R, completes a first circuit including contacts 11R3 and relay 14R and a second circuit including contacts 11R3, contacts 2R2, contacts 14R2, and relay 12R. The approximate 1-second delay of relay 14R allows relay 12R to be energized before contacts 14R2 are opened by relay 14R. The energization of relay 12R closes contacts 12R1 and 12R4 and opens contacts 12R2 and 12R3. Contacts 12R1 of relay 12R are holding contacts which allow relay 12R to remain energized after contacts 14R2 are opened after about 1-second delay. The opening of contacts 12R2 opens a circuit to terminals A of switches S3–S9 whereby relays 3R–9R are immediately and simultaneously de-energized and contacts 9R2 closed. The closure of contacts 9R2 establishes a holding circuit including contacts 9R2, 14R1 and relay 14R. Thus heaters H3–H9, which represent about 38½% of the total heating capacity, are de-energized substantially simultaneously with the energizing of heater H11 which represents 45% of the total heating capacity of a net increase of 6½%. The opening of contacts 12R3 and the closing of contacts 12R4 remove the operation of cam motor 26 from under the control of thermostat 46 and complete a circuit including contacts 12R4 and reverse winding coil 34 whereby the cam motor 26 is driven in the reverse (clockwise) direction. Actuation of switch 10 from its position bridging terminals A–C terminals B–C de-energizes relay 10R to de-energize heater H10 whereby the net increase in heating capacity is reducted to 1%.

The cam proceeds in this direction until switch S2 is actuated to open the circuit between terminals A–C thereby de-energizing relay 2R which in turn de-energizes heater H2 via contacts 2R1 and opens contacts 2R2. The opening of contacts 2R2 de-energizes relay 12R thereby re-establishing the original positions of contacts 12R1, 12R2, 12R3, and 12R4. This stops the operation of cam 38 and places the control of cam motor 26 once again under the control of thermostat 46. During this reverse movement of cam 38 relay 11R remains energized through a holding circuit including terminals A–C of switch S1, contacts 11R2 and relay 11R.

Should the thermostat continue to sense the need for additional heat in this high level output mode (heater H11 energized), the circuit which includes terminals A–C of thermostat 46, contacts 12R3, and forward winding 30 will be energized causing the cam 38 to rotate once again in the counterclockwise direction once again actuating switches S2 through S10 thereby progressively adding the heat output of heaters H2–H10 to the energized heaters H1, and H11.

During operation of the control circuit in this high level output mode, the thermostat can thus sequentially energize heaters H2–H10 and sequentially de-energize heaters H10–H2 without de-energizing heaters H1 and H11.

However, should the heating demand for space 18 fall sufficiently so that the cam 38 is driven clockwise sufficiently that the raised portion 40 clears switch S1, the controller is automatically switched to the low level output mode. This is accomplished as follows. The opening of terminals A–C of switch S1 de-energizes the circuit including terminals A–C of switch S1, contacts 11R2, and relay 11R. The de-energization of relay 11R opens contacts 11R1, 11R2. The opening of contacts 11R1 de-energizes heater H11 and the opening of contacts 11R2 breaks the holding circuit for relay 11R which cannot again be re-established until contacts 10R2 of relay 10R are closed.

The actuation of switch S1 also de-energizes relay 1R causing contacts 1R2 to be closed. This establishes a circuit including contacts 9R2, 14R1, 1R2 and relay 13R thereby energizing relay 13R. The energization of relay 13R closes contacts 13R1, 13R2 and 13R3 and opens contacts 13R4. The closure of contacts 13R1 establishes a holding circuit for relay 13R in the event that contacts are opened. The closure of contacts 13R2 completes a circuit to the terminals B of switches S2 through S8 thereby simultaneously energizing relays 2R–8R which in turn energizes heaters H2–H8. The energization of heaters H2–H8 which represent about 38½% of the total power are thus energized substantially simultaneously with the de-energization of H11 which represents about 45% of the total power for a net decrease of 6½% power output. The closure of contact 13R3 and opening of contact 13R4 disengages thermostat 46 from control of cam motor 26 and causes a circuit to be completed including contacts 13R3 and forward winding 30 of cam motor 26 whereby the cam 38 is driven in the forward counterclockwise direction causing switches S1–S9 to be actuated to the position connecting terminals A–C. When switch S1 is so actuated relay 1R is energized to energize H1 whereby the net decrease in heating capacity is reduced to 1%. The bridging of terminals A–C in switch 9 causes a circuit to be completed as hereinbefore described energizing relay 9R. The energization of relay 9R opens contacts 9R2 thereby de-energizing the circuit which includes contacts 9R2, 14R1, 13R1 and relay 13R thereby de-energizing relay 13R. The de-energization of relay 13R once again places the control of the cam motor 26 upon thermostat 46 in the low level output mode by the opening of contacts 13R3 and the closing of contacts 13R4.

The control system at the direction of the thermostat 46 will thus switch back and forth between high and low level power output modes providing a total number of small incremental changes which exceeds the number of steps provided by the step controller. This is accomplished by causing the two end switches (S1 and S10 through contacts 1R2 and 11R3) to function to switch the modes of output power between high and low levels through a repositioning of the step controller. The second from the last switches from each end of the controller (S2 and S9 through contacts 2R2 and 9R2) respectively end the repositioning sequence.

It will be appreciated that many changes may be made without departing 10R2, 11R2 the spirit of this invention. Thus the number of controller switches may be readily changed. Secondly, all the switches of the controller need not be used. For this reason the term "last switch" as used in this specification refers to the last of a series of sequential switches which are used. Further, it will be appreciated that the controller switches used to end the repositioning of the controller need not be those second from the ends but could be third or fourth, etc., from the ends with a reduced number of available steps. It should also be understood that equivalent circuit arrangements may be devised to carry out the invention such as for example the heaters may be directly energized through the controller switches or the contacts 1R2, 2R2, 9R2, 11R2 and 11R3 may be placed on relays separate from the heater relays. Further as aforementioned, any heater may have multiple elements each of which may be controlled by a separate relay. This is likely to be necessary for heater H11 in order to limit the power flowing through contacts 11R1.

Thus it will be seen that I contemplate that many changes may be made without departing from the spirit of my invention. I accordingly desire my invention to be limited only by the claims. Reference characters used within the claims are intended to assist in reading the claim upon the disclosure but not by way of limitation.

I claim:

1. A method of controlling a plurality of electric heaters for heating a space including one large heater and a plurality of smaller heaters, each of said large and small heaters having a separate actuator means for actuating its respective heater toward an energized condition comprising the steps upon a continuous heating demand as sensed by a thermostat responsive to the temperature of said space of:
    A. sequentially actuating said actuator means of said smaller heaters toward their heater energizing conditions;
    B. subsequently deactuating said actuator means of said smaller heaters toward their heater de-energizing condition and actuating said actuator means for said larger heater toward its heater energizing condition; and
    C. subsequently sequentially reactuating said deactuated actuator means until all of said actuator means for said large and smaller heaters are actuated toward their heater energizing condition.

2. The method as defined by claim 1 wherein said deactuated actuator means are deactuated sequentially in step B in the reverse order that they are actuated in step A.

3. The method as defined by claim 1 including the step prior to step B of simultaneously disabling all of said actuator means to be sequentially deactuated in step B.

4. The method as defined by claim 2 including the step of disabling said thermostat while said actuator means are being sequentially deactuated.

5. A system (20) for controlling the temperature of space (18) comprising: one large capacity electric heater means (H11) for heating said space; a plurality of smaller capacity electric heater means (H1–H10) for heating said space; a step controller means (25) for controlling the operation of said large and smaller capacity electric heater means; said step controller means including a plurality of sequentially actuatable controller switches (S1–S10) operatively associated with said heater means including a first, second, third, fourth, fifth switches (S1, S2, S3, S4, S9) respectively operatively associated with first, second, third, fourth, fifth (H1, H2, H3, H4, H9) of said smaller capacity heater means, and a sixth switch (S10) operatively associated with said large capacity heater means (H11), cam means (38) for sequentially actuating said first, second, third, fourth, fifth and sixth controller switches and a reversable cam motor (26) drivingly connected to said cam means; first motor circuit means (32) for energizing said motor to drive said cam means in a forward direction for sequentially actuating said first, second, third, fourth, fifth and sixth switches toward a first (A) position; second motor circuit means (36) for energizing said motor to drive said cam means in a reverse direction for sequentially actuating said sixth, fifth, fourth, third, second and first switches toward a second position (B); a thermostat (46) operatively associated with said first and second motor circuit means to energize said first motor circuit in response to a demand for additional heat at said space and to energize said second motor circuit in response to a demand for reduced heat at said space; first means (12R, 12R4, and 12R3) overriding said thermostat for energizing said motor to drive said cam means in a reverse direction; second means (13R, 13R3 and 13R4) overriding said thermostat for energizing said motor to drive said cam means in a forward direction; holding means (S1 and 11R2) responsive to actuation of said sixth switch toward its heater energizing position (A) for holding said large heater means energized despite subsequent actuation of said sixth switch to a heater non-energizing position (B); and means (11R3) operatively associated with said sixth switch for actuating said first overriding means whereby upon a continued demand for additional heat as sensed by said thermostat, said cam means is first driven in a forward direction sequentially energizing said smaller heater means and then said larger heater means whereupon via said holding means and said first overriding means said large heater means is held energized and said cam is driven in the reverse direction.

6. The apparatus ad defined by claim 5 including means (2R2) operatively associated with said second switch (S2) for deactivating said first overriding means whereby the position of said cam means is again placed under the control of said thermostat.

7. The apparatus as defined by claim 6 including means (1R2) operatively associated with said first switch (S1) for activating said second overriding means to drive said cam means in a forward direction; and means (S1) operatively associated with said first switch (S1) for disabling said holding means (S1 and 11R2).

8. The apparatus as defined in claim 7 including means (9R2) operatively associated with said fifth switch (S9) for deactivating said second overriding means (13R, 13R3, and 13R4).

9. The apparatus as defined by claim 5 including heater disabling means (12R, 12R2) for substantially simultaneously de-energizing a plurality (H3, H4, H9) of said smaller heater means and means (11R3) operatively associated with said sixth switch (S10) for actuating said heater disabling means (12R and 12R2).

10. The apparatus as defined by claim 9 including means (2R2) operatively associated with said second switch (S2) for interrupting said disabling means.

11. The apparatus as defined by claim 7 including heater energizing means (13R, 13R2) for substantially simultaneously energizing a plurality of said smaller heater means (H3, H4 and H9) and means (1R2) operatively associated with said first switch (S1) for actuating said heater energizing means.

12. The apparatus as defined by claim 11 including means (9R2) operatively associated with said fifth switch (S9) for interrupting said heater energizing means.

* * * * *